(12) United States Patent
Hirata (10) Patent No.: US 7,708,095 B2
(45) Date of Patent: May 4, 2010

(54) CONTROL APPARATUS AND METHOD FOR HYBRID VEHICLE

(75) Inventor: Takeshi Hirata, Sagamihara (JP)

(73) Assignee: Nissan Motor Co., Ltd, Yokohama-shi (JP)

( * ) Notice: Subject to any disclaimer, the term of this patent is extended or adjusted under 35 U.S.C. 154(b) by 537 days.

(21) Appl. No.: 11/752,655

(22) Filed: May 23, 2007

(65) Prior Publication Data

US 2007/0275819 A1 Nov. 29, 2007

(30) Foreign Application Priority Data

May 29, 2006 (JP) .............................. 2006-147583

(51) Int. Cl.
*B60W 10/02* (2006.01)

(52) U.S. Cl. .............................. 180/65.275; 180/65.21; 180/65.265; 192/82 T; 477/5; 477/98

(58) Field of Classification Search ............. 180/65.21, 180/65.22, 65.25, 65.265, 65.275, 665.7; 192/82 T, 103 R; 477/5, 6, 98
See application file for complete search history.

(56) References Cited

U.S. PATENT DOCUMENTS

| | | | | | |
|---|---|---|---|---|---|
| 4,169,527 | A | * | 10/1979 | Bopp | ........................ 192/82 T |
| 6,808,470 | B2 | * | 10/2004 | Boll | .............................. 477/6 |
| 2003/0153429 | A1 | | 8/2003 | Boll | |

| | | | |
|---|---|---|---|
| 2005/0090370 | A1 | 4/2005 | Berger et al. |
| 2006/0276287 | A1* | 12/2006 | Lang et al. ...................... 475/5 |

FOREIGN PATENT DOCUMENTS

| | | |
|---|---|---|
| DE | 101 58 536 A1 | 7/2003 |
| DE | 102 04 982 A1 | 8/2003 |
| DE | 103 16 422 A1 | 12/2003 |
| DE | 103 19 880 A1 | 11/2004 |
| EP | 1 209 017 A2 | 5/2002 |
| JP | H11-082260 | 3/1999 |
| JP | 2000-255285 | 9/2000 |
| JP | 2005-221073 | 8/2005 |

* cited by examiner

*Primary Examiner*—Paul N Dickson
*Assistant Examiner*—Bryan A Evans
(74) *Attorney, Agent, or Firm*—Young Basile (57) ABSTRACT

A control apparatus and method for a hybrid vehicle having a first engagement element between an engine and a motor-generator and a second engagement element between the motor-generator and a drive wheel. During EV drive mode, the first engagement element disengages and the second engagement element engages to drive the vehicle using the motor-generator. During HEV drive mode, the first and second engagement elements engage to drive the vehicle using both power sources. During a third drive mode, the first engagement element engages and the second engagement element slip-engages to drive the vehicle by both power sources. When a detected temperature of the second engagement element is too high during low-speed driving, the EV drive mode is selected to enhance durability of the second engagement element.

20 Claims, 8 Drawing Sheets

| | C1 | C2 | C3 | B1 | B2 | B3 | B4 | F1 | F2 | F3 |
|---|---|---|---|---|---|---|---|---|---|---|
| 1ST | | (○)* | | | ● | (○) | ○ | | △ | △ |
| 2ND | | | ○ | | (○) | (○) | ○ | | △ | △ |
| 3ND | | ○ | ○ | | (○) | | ● | C | △ | |
| 4TH | ○ | ○ | ○ | | | | ● | C | | |
| 5TH | ○ | ○ | | | | ○ | ● | C | C | |
| REV | | ○ | | ○ | ○ | | | △ | △ | |

△ : CONTRIBUTING TO TORQUE TRANSFER DURING POWER-ON PERIOD
C : CONTRIBUTING TO TORQUE TRANSFER DURING COASTING
● : HYDRAULIC-PRESSURE SUPPLY TO FRICTION ELEMENT WITH NO ACTION AFFECTING OUTPUT
(○) : ENGAGED AT OVERRUN MODE
(○)* : ENGAGED WHEN SELECTED, AND THEREAFTER DISENGAGED EXCEPT OVERRUN MODE
○ : ENGAGED

CONTROL APPARATUS AND METHOD FOR HYBRID VEHICLE

CROSS-REFERENCE TO RELATED APPLICATION

This application claims priority from Japanese Patent Application Serial No. 2006-147583, filed May 29, 2006, which is incorporated herein in its entirety by reference.

FIELD OF THE INVENTION

The invention relates in general to a control apparatus of a hybrid vehicle employing an engine and a motor as a power source.

BACKGROUND

Hybrid vehicles have an electric drive (EV) mode, in which the hybrid vehicle travels only by power from the motor-generator, and a hybrid drive (HEV) mode, in which the hybrid vehicle can travel by power from both the engine and the motor-generator. For example, Japanese Patent Provisional Publication No. 2005-221073 discloses a hybrid system that employs a first engagement element that performs connecting/disconnecting actions of a power transmission path between an engine and a motor-generator, and a second engagement element that performs connecting/disconnecting actions of a power transmission path between the motor-generator and drive wheels. Switching between the EV and HEV drive modes occurs depending on a vehicle driving condition (engine/vehicle operating conditions) to improve fuel economy.

According to the technique disclosed therein, the second engagement element is subjected to slip control during the engine starting operation initiated when switching from the EV drive mode to the HEV drive mode, so as to reduce a shock.

BRIEF SUMMARY OF THE INVENTION

Embodiments of a control apparatus for a hybrid-vehicle and methods are taught herein. One embodiment of a control apparatus for a hybrid vehicle comprises an engine, a motor-generator, a first engagement element disposed between the engine and the motor-generator, a second engagement element disposed between the motor-generator and a drive wheel, a temperature detector operable to detect a temperature of the second engagement element and a controller. By example, the controller is operable to selectively provide one of a first drive mode in which the first engagement element is disengaged and the second engagement element is engaged to drive the vehicle only using the motor-generator, a second drive mode in which the first and second engagement elements are engaged to drive the vehicle using both the engine and the motor-generator and a third drive mode in which the first engagement element is engaged and the second engagement element is in slip-engagement to drive the vehicle using both the engine and the motor-generator. The controller in this example is also operable to select the first drive mode when the temperature of the second engagement element is higher than or equal to a predetermined temperature value during a low-speed driving period below a predetermined vehicle speed.

Another embodiment is a controller for a hybrid vehicle having an engine, a motor-generator, a first engagement element disposed between the engine and the motor-generator and a second engagement element disposed between the motor-generator and a drive wheel. One example of a controller taught herein comprises means for detecting a temperature of the second engagement element and means for disengaging the first engagement element and engaging the second engagement element to drive the vehicle only by a driving force produced by the motor-generator when a temperature of the second engagement element is higher than or equal to a predetermined temperature value during a low-speed driving period below a predetermined vehicle speed.

Embodiments of a control method for a hybrid vehicle are also taught herein. One such control method includes, by example, detecting a temperature of the second engagement element and disengaging the first engagement element and engaging the second engagement element to drive the vehicle only by a driving force produced by the motor-generator when a temperature of the second engagement element is higher than or equal to a predetermined temperature value during a low-speed driving period below a predetermined vehicle speed.

BRIEF DESCRIPTION OF DRAWINGS

The description herein makes reference to the accompanying drawings wherein like reference numerals refer to like parts throughout the several views, and wherein.

DETAILED DESCRIPTION OF EMBODIMENTS OF THE INVENTION

As described above, when switching from the EV drive mode to the HEV drive mode while driving a hybrid vehicle, the second engagement element is subjected to slip control during the engine starting operation so as to reduce a shock due to engine start up. However, the second engagement element may be overheated, thereby resulting in deterioration in durability of the second engagement element.

Accordingly, embodiments of the invention taught herein provide a control apparatus of a hybrid vehicle capable of enhancing the durability of the second engagement element.

According to embodiments of the control apparatus taught herein, when the temperature of the second engagement element is higher than or equal to the predetermined temperature value, the apparatus selects the first drive mode at which the second engagement element is completely engaged. There is no possibility that the second engagement element is further overheated. Thus, it is possible to enhance the durability of the second engagement element.

The following describes embodiments of the invention in detail with reference to the accompanying drawings.

Figure 1:
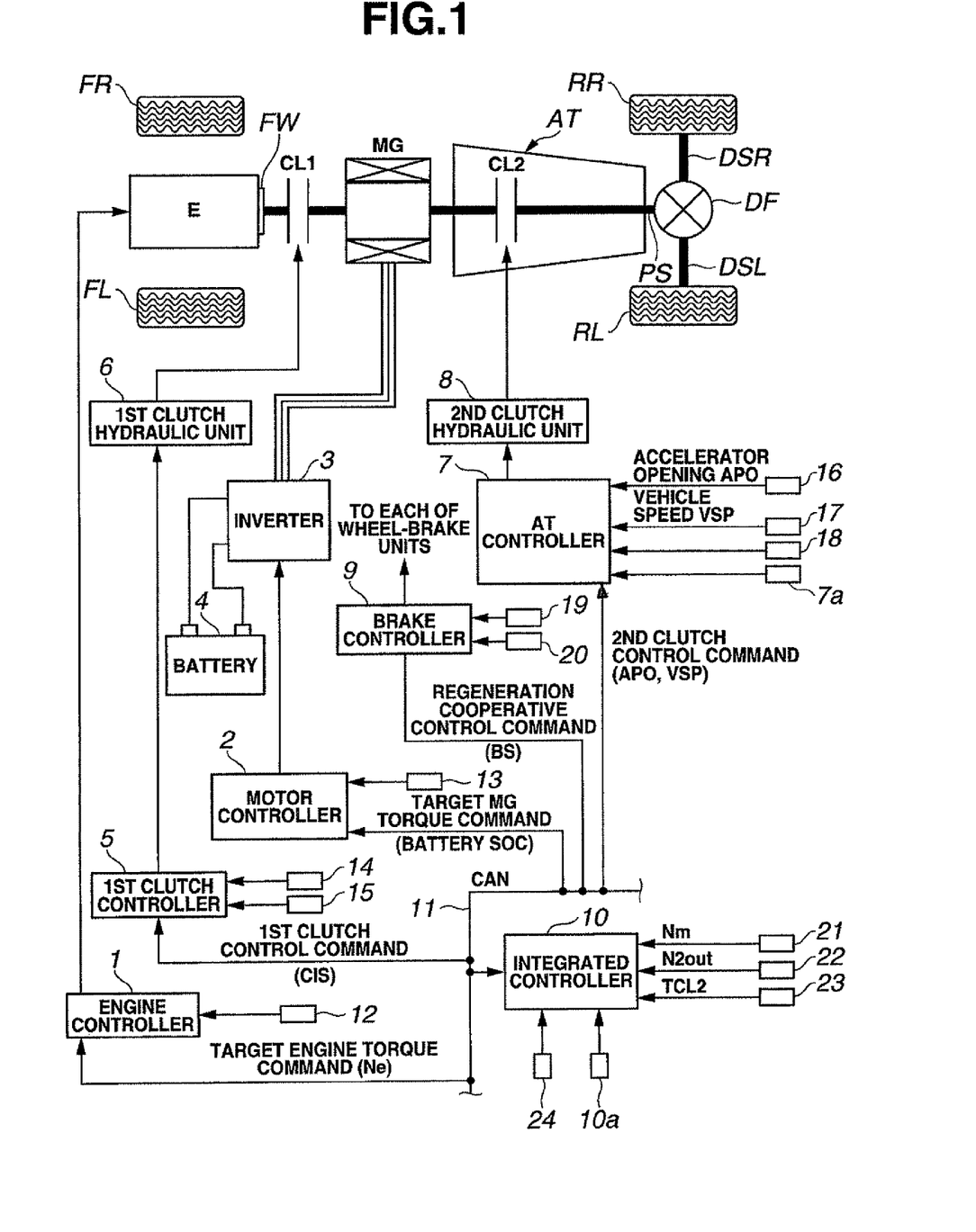
FIG. 1 is a general system diagram showing a rear-wheel-drive hybrid vehicle to which embodiments of a starting-period engine start-up control apparatus are applied.

Hereunder described is a drive system configuration of the hybrid vehicle. FIG. 1 is the general system diagram showing the rear-wheel-drive hybrid vehicle to which embodiments of the control apparatus can be applied. As seen in FIG. 1, the drive system of the hybrid vehicle includes an engine E, a flywheel FW, a first clutch CL1, a motor-generator MG, a second clutch CL2, an automatic transmission AT, a propeller shaft PS, a differential DF, a left driveshaft DSL, a right driveshaft DSR, a rear-left drive wheel RL and a rear-right drive wheel RR. In FIG. 1, reference sign "FL" denotes a front-left wheel, whereas reference sign "FR" denotes a front-right wheel.

Engine E is a gasoline engine or a Diesel engine. A throttle valve opening is controlled responsive to a control command from an engine controller 1 (described later). Flywheel FW is installed on the engine output shaft.

First clutch CL1 is disposed between engine E and motor-generator MG. Engagement and disengagement, including slip engagement and disengagement, respectively, of the first clutch CL1 are controlled by hydraulic pressure created by a first clutch hydraulic unit 6 responding to a control command from a first clutch controller 5 (described later).

Motor-generator MG is a synchronous motor generator in which a permanent magnet is built in a rotor and a stator coil is wound on a stator. The motor-generator MG is controlled by application of a three-phase alternating current created by an inverter 3 responsive to a control command from a motor controller 2 (described later). Motor-generator MG can operate as an electric motor, which rotates by electric power supply from a battery 4. This operating state is hereinafter referred to as "power-running". Also, the motor-generator can operate as a generator that generates an electromotive force at both ends of the stator coil when the rotor is rotating by an external force, thus enabling charging of battery 4. This operating state is hereinafter referred to as "regeneration". The rotor of motor-generator MG is connected via a damper (not shown) to the input shaft of automatic transmission AT.

Second clutch CL2 is disposed between motor-generator MG and rear-left and rear-right wheels RL, RR. Engagement and disengagement, including slip engagement, of the second clutch CL2 are controlled by hydraulic pressure created by a second clutch hydraulic unit 8 responsive to a control command from an AT controller 7 (described later).

Automatic transmission AT is a stepped automatic transmission such as a five-forward-and-one-reverse-speed transmission, whose transmission ratio can be automatically changed depending on operating conditions such as, for example, vehicle speed VSP and accelerator opening APO. Second clutch CL2 is not a newly-added clutch. Instead, several friction elements selectively engaged depending on a selected one of a range of gear positions of automatic transmission AT may also serve as the previously-noted second clutch. The details of the second clutch are described later.

The output shaft of automatic transmission AT is connected through propeller shaft PS, differential DF, left drive shaft DSL, and right drive shaft DSR to rear-left and rear-right wheels RL, RR. In the embodiment in FIG. 1, each of the first and second clutches CL1 and CL2 is constructed of wet multiple disc clutches to which a supplied oil flow rate and an oil pressure can be continuously controlled by means of a proportional solenoid.

The hybrid drive system has three drive modes that depend on whether the first clutch CL1 is in an engaged state or in a disengaged state. The first drive mode is an electric drive mode (hereinafter is referred to as "EV mode") corresponding to a motor-used drive mode in which, with first clutch CL1 disengaged, only the power produced by motor-generator MG is used as a power source to drive the vehicle. The second drive mode is a hybrid drive mode (hereinafter is referred to as "HEV mode") corresponding to an engine-used drive mode in which, with the first clutch CL1 engaged, the vehicle runs with the engine E as an additional power source. The third drive mode is a Wet Start Clutch drive mode (hereinafter is referred to as "WSC mode") corresponding to an engine-used slip drive mode in which, with first clutch CL1 engaged, second clutch CL2 is subjected to slip control and the vehicle runs while including engine E as a power source.

The previously-noted "HEV mode" consists of three drive modes, namely an "engine drive mode", a "motor-assist drive mode" and a "running power-generation mode."

In the "engine drive mode" only the engine E is used as a power source for moving the drive wheels. In the "motor-assist drive mode" engine E and motor-generator MG are both used as power sources for moving the drive wheels. In the "running power-generation mode" engine E is used as a power source for moving the drive wheels RR, RL, and at the same time the motor-generator MG is functioning as a generator.

During constant-speed driving or during vehicle acceleration, motor-generator MG is operated as a generator, utilizing the power produced by engine E. During vehicle deceleration, a braking energy is regenerated by means of motor-generator MG for electric power generation, and then the regenerated electric energy is stored in battery 4 for charging.

As a further mode, there is an electric-power-generation mode, at which motor-generator MG is operated as a generator utilizing the power of engine E in a vehicle standstill state.

The control system of the hybrid vehicle is hereinafter described in detail. As shown in FIG. 1, an embodiment of the control system of the hybrid vehicle is comprised of an engine controller 1, a motor controller 2, an inverter 3, a battery 4, a first clutch controller 5, a first clutch hydraulic unit 6, an AT controller 7, a second clutch hydraulic unit 8, a brake controller 9 and an integrated controller 10. The engine controller 1, motor controller 2, first clutch controller 5, AT controller 7, brake controller 9 and integrated controller 10 are mutually connected to each other via a CAN communication line 11 for information interchange among the controllers.

Engine controller 1 receives input information from an engine speed sensor 12 that detects engine speed Ne. In response to a target engine torque command from integrated controller 10, the engine controller 1 outputs a command used to control an engine operating point, for example engine speed Ne or engine torque Te, through a throttle valve actuator (not shown). Information regarding engine speed Ne is supplied via CAN communication line 11 to the integrated controller 10.

Motor controller 2 receives input information from a resolver 13 that detects a rotational position of the rotor of motor-generator MG. In response to a target motor-generator torque command from integrated controller 10, the motor controller 2 outputs a command used to control a motor operating point, for example motor speed Nm or motor torque Tm, of motor-generator MG to inverter 3. Motor controller 2 also serves to monitor a state of charge (SOC) of battery 4. The battery SOC information is informational data used as an input for control of motor-generator MG. The battery SOC information is also supplied to integrated controller 10 via CAN communication line 11.

First clutch controller 5 receives informational data signals from a first clutch hydraulic pressure sensor 14 and a first clutch stroke sensor 15. In response to a first clutch control command from integrated controller 10, the first clutch controller 5 outputs a command for engagement-and-disengagement control of the first clutch CL1 to the first clutch hydraulic unit 6. The information regarding first clutch stroke C1S detected by the first clutch stroke sensor 15 is also supplied to integrated controller 10 via CAN communication line 11.

AT controller 7 receives informational data signals from an accelerator opening sensor 16, a vehicle speed sensor 17, a second clutch hydraulic pressure sensor 18 and an inhibitor switch 7a. The inhibitor switch 7a outputs a signal indicative of a shift lever position selected by the driver. In response to a second clutch control command from integrated controller 10, the AT controller 7 outputs a command for engagement-and-disengagement control of second clutch CL2 to second clutch hydraulic unit 8 installed in an AT hydraulic control valve. The information regarding accelerator opening APO (an accelerator-pedal depression amount), vehicle speed VSP and the switch signal from inhibitor switch 7a are also supplied via CAN communication line 11 to integrated controller 10.

Brake controller 9 receives informational data signals from a wheel speed sensor 19 that detects each of the wheel speeds of the four wheels and a from a brake stroke sensor 20. For instance, suppose that a required braking force, which is derived from brake stroke BS detected by brake stroke sensor 20 during braking, cannot be achieved by only a regenerative braking force. In such a case, the brake controller 9 performs regeneration cooperative brake control in response to a regeneration cooperative control command from integrated controller 10. Hence, a lack of the required braking force from the regenerative braking force can be compensated for with mechanical braking force, such as for example a fluid-pressure braking force or a motor braking force.

Integrated controller 10 manages the total energy consumed by the vehicle, and functions to operate the vehicle at its most efficient mode. The integrated controller 10 receives information from a motor speed sensor 21 that detects motor speed Nm, a second clutch output speed sensor 22 that detects a second clutch output speed N2out, a second clutch torque sensor 23 that detects a second clutch torque TCL2, a brake fluid pressure sensor 24, and a temperature sensor 10a that detects a temperature of second clutch CL2. The information is received via CAN communication line 11.

In the system configuration described herein, there are two types of second clutch CL2, a forward brake B4 and a high-and-low reverse clutch C2, the type depending on the range of gear positions of automatic transmission AT. Thus, a plurality of temperature sensors are provided for detecting the respective oil temperatures of these two second clutches. Instead of actually installing temperature sensor 10a, for example, the system may use a temperature detector that estimates and computes a heating value based on a slippage (or a slip ratio) and an engagement capacity of second clutch CL2. It will be appreciated that the temperature detector is not limited to the particular embodiments shown and described herein.

Integrated controller 10 generates a control command to engine controller 1 for operational control of engine E, a control command to motor controller 2 for operational control of motor-generator MG, a control command to first clutch controller 5 for engagement-and-disengagement control of first clutch CL1 and a control command to AT controller 7 for engagement-and-disengagement control of second clutch CL2.

Furthermore, integrated controller 10 monitors or determines, based on the temperature of second clutch CL2 detected by temperature sensor 10a, whether the detected temperature is higher than or equal to a predetermined temperature value indicative of an abnormality. When the detected temperature is higher than or equal to the predetermined temperature value, overheating-period adaptive control is executed to prevent second clutch CL2 from being further overheated. The overheating-period adaptive control is hereinafter described in detail.

Each controller described herein, including the integrated controller 10, generally consists of a microcomputer including central processing unit (CPU), input and output ports (I/O) receiving certain data described herein, random access memory (RAM), keep alive memory (KAM), a common data bus and read only memory (ROM) as an electronic storage medium for executable programs and certain stored values as discussed herein. The functional (or processing) units/sections of the integrated controller 10 described herein could be, for example, implemented in software as the executable programs, or could be implemented in whole or in part by separate hardware in the form of one or more integrated circuits (IC). Also, although each of the controllers is shown as a separate device, the controllers can be implemented by fewer devices, including a common device.

Figure 2:
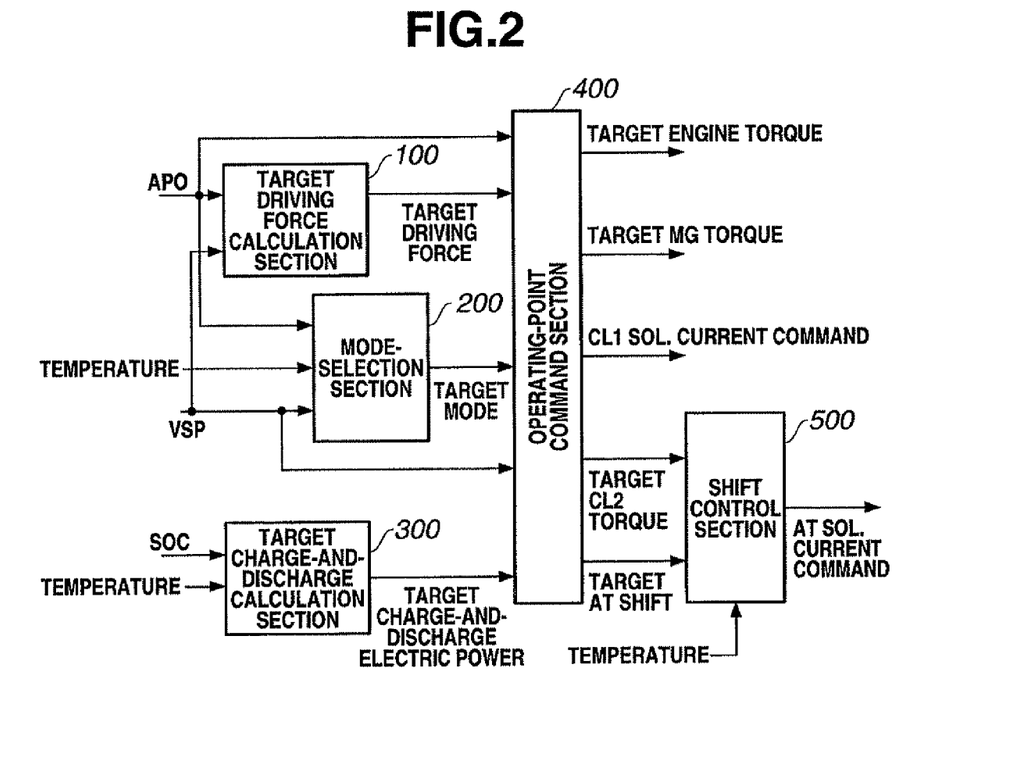
FIG. 2 is a control system block diagram showing arithmetic processing executed within an integrated controller of a first embodiment of the control apparatus.

The details of arithmetic processing performed by integrated controller 10 as incorporated in a first embodiment of the control apparatus are described with reference to FIG. 2. The arithmetic processing is executed by integrated controller 10 at regular predetermined time intervals, such as 10 milliseconds. Integrated controller 10 is comprised of a target driving force calculation section 100, a mode-selection section 200, a target charge-and-discharge calculation section 300, an operating-point command section 400 and a shift control section 500.

Figure 3:
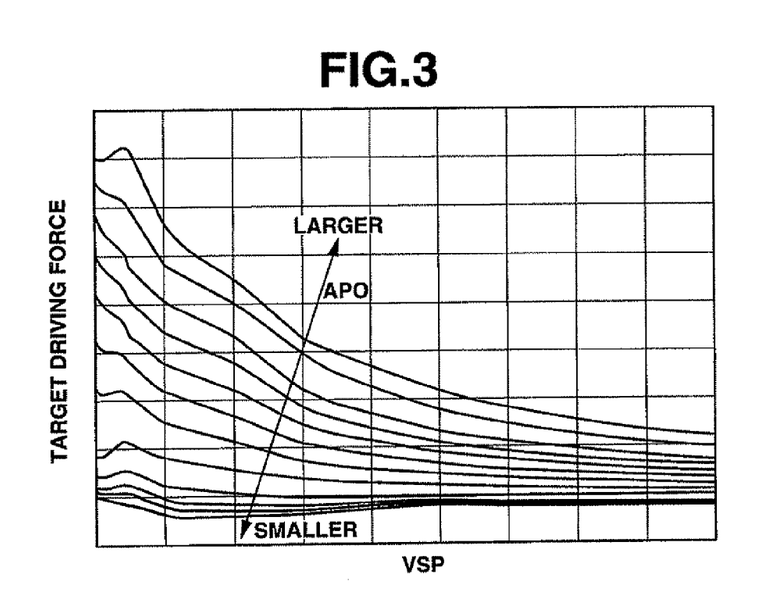
FIG. 3 is a characteristic diagram showing one example of a target driving force map used to calculate the target driving force, the calculation executed within a target driving force calculation section of FIG. 2.

Target driving force calculation section 100 calculates or retrieves, based on accelerator opening APO and vehicle speed VSP, a target driving force tFo0 from a target driving force map such as that shown in FIG. 3.

Figure 4:
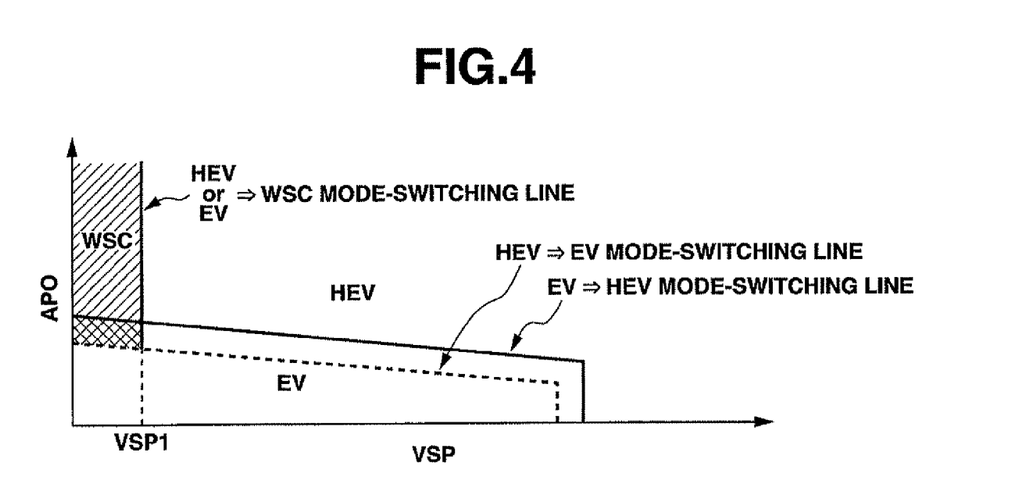
FIG. 4 is a diagram showing an EV-HEV mode-selection map used for target mode selection executed within a mode-selection section of FIG. 2.

Mode-selection section 200 calculates or retrieves, based on accelerator opening APO and vehicle speed VSP, a target mode from an EV-HEV mode-selection map such as that shown in FIG. 4. However, under a particular condition where the state of charge (SOC) of the battery 4 is less than or equal to a predetermined SOC threshold value, the "HEV mode" is forcibly selected as the target mode.

The above-mentioned WSC mode is provided in a low vehicle speed range on the EV-HEV mode-selection map to allow for output of the necessary driving force when accelerator opening APO is great in the low vehicle speed range, such as during a vehicle starting period or during uphill-driving. The WSC mode is provided in the low vehicle speed range because in this embodiment, an element such as a torque converter to serve as a rotational speed absorption device is not provided, and thus the vehicle speed is determined based on engine speed Ne when first and second clutches CL1 and CL2 are completely engaged.

An engine has a lower limit speed value, for example, an idle speed, needed to maintain its self-rotation. The idle speed tends to increase under a particular operating condition where a so-called idle-up operation is executed during engine warm-up. In order to satisfy a required driving force even under such an operating condition, the second clutch CL2 is subjected to slip control, such that switching to the WSC mode enables the vehicle to run, while using the engine E as a power source during low-speed driving for a vehicle starting period or during uphill-driving.

Therefore, an HEV→WSC mode-switching line or an EV→WSC mode-switching line is set in a vehicle speed range less than a predetermined vehicle speed VSP1 (lower than an idle speed of engine E) when automatic transmission AT is in the first speed gear. The diagonally-shaded area shown in FIG. 4 corresponds to an area in which the drive mode may switch from the HEV mode to the WSC mode. The meshed area shown in FIG. 4 corresponds to an area in which the mode may be switched from the WSC mode to the EV mode.

During the WSC mode in which second clutch CL2 is subjected to slip control, there is a risk that second clutch CL2 may overheat, reducing the durability of second clutch CL2. Therefore, the mode-selection section 200 of the integrated controller 10 further includes or stores an overheating-period adaptive EV-HEV mode-selection map such as that shown in FIG. 10. As compared to the normal control state EV-HEV mode-selection map of FIG. 4, in FIG. 10 the area under the EV→HEV mode-switching line, representing the EV mode area, is larger (wider). Additionally, the HEV→EV mode-switching line is preset to permit the mode-switching operation only when the vehicle speed falls below the predetermined vehicle speed VSP1 (which is lower than the idle speed of engine E) when automatic transmission AT is in the first speed gear. In other words, the EV mode is maintained as long as possible. Once the mode has been switched to the HEV mode, the HEV mode is maintained as long as possible.

Figure 5:
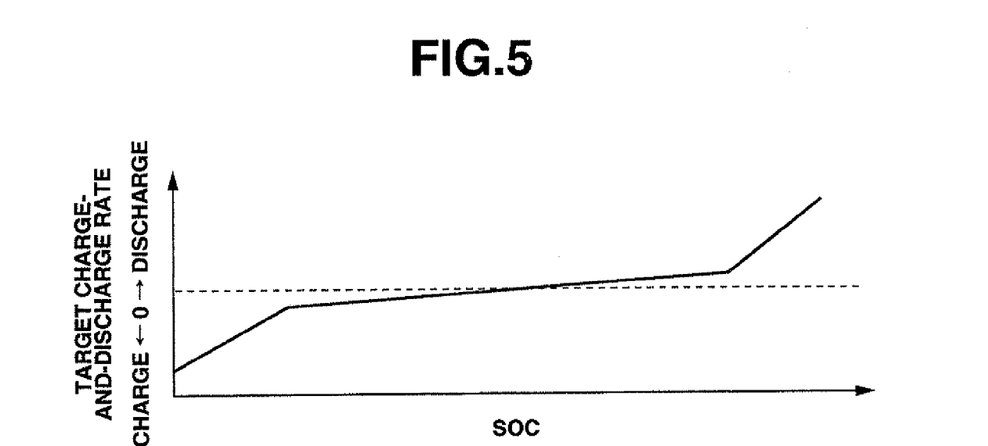
FIG. 5 is a characteristic diagram showing one example of a target charge-and-discharge rate map used for target charge-and-discharge electric power calculation executed within a target charge-and-discharge calculation section of FIG. 2.

Target charge-and-discharge calculation section 300 calculates or retrieves, based on the battery SOC information, a target charge-and-discharge electric power tP from the target charge-and-discharge rate map of FIG. 5. The target charge-and-discharge calculation section 300 further includes or stores an overheating-period adaptive target charge-and-discharge rate map such as that shown in FIG. 11. As compared to the normal control state target charge-and-discharge rate map of FIG. 5, the characteristic diagram of the overheating-period adaptive target charge-and-discharge rate map is set such that there is a demand for battery charging even when the state of charge (SOC) is high.

As targets for each operating point, operating-point command section 400 transiently calculates a target engine torque, a target motor-generator torque, a target second clutch engagement capacity, a target automatic transmission range gear shift and a first clutch solenoid current command. These calculations are based on the target mode, accelerator opening APO, target driving force tFo0, vehicle speed VSP and target charge-and-discharge electric power tP. Operating-point command section 400 also includes an engine start-up control section that starts up engine E when an EV-to-HEV mode transition occurs.

Engine start-up control is now described in detail. When an engine start-up is demanded, the engagement capacity of second clutch CL2 is set to an engagement capacity corresponding to the output shaft torque, and the driving force produced by motor-generator MG is increased. Thus, the number of revolutions (MG speed) of motor-generator MG rises due to the increased driving force, since only the engagement capacity of second clutch CL2 acts as a load on motor-generator MG. On the other hand, there is a less fluctuation in transmission (TM) output torque, since the TM output torque is determined based on the engagement capacity of second clutch CL2.

Thereafter, when a determination is made that the driving force of the motor-generator MG has increased to a predetermined amount, for instance, at a stage that the MG speed exceeds the TM speed by a predetermined number of revolutions, then the engagement capacity of the first clutch CL1 is increased to a predetermined value. The engagement capacity of the first clutch is increased to start up the engine E as quickly as possible.

When the engagement capacity of first clutch CL1 is increased to the predetermined value, the load on motor-generator MG is increased. The motor-generator torque increases as well due to the increase in engagement capacity of first clutch CL1. When the engagement capacity of first clutch CL1 is increased to the engagement capacity corresponding to a torque value required for engine start-up, the cranking operation of engine E can be initiated. As a result, self-rotation of engine E is initiated, and engine start-up operation is complete. That is, during engine start-up control, the start-up operation is performed in a state where the second clutch CL2 is continually kept in its slip state and thus fluctuations in TM output torque are suppressed as much as possible.

Figure 6:
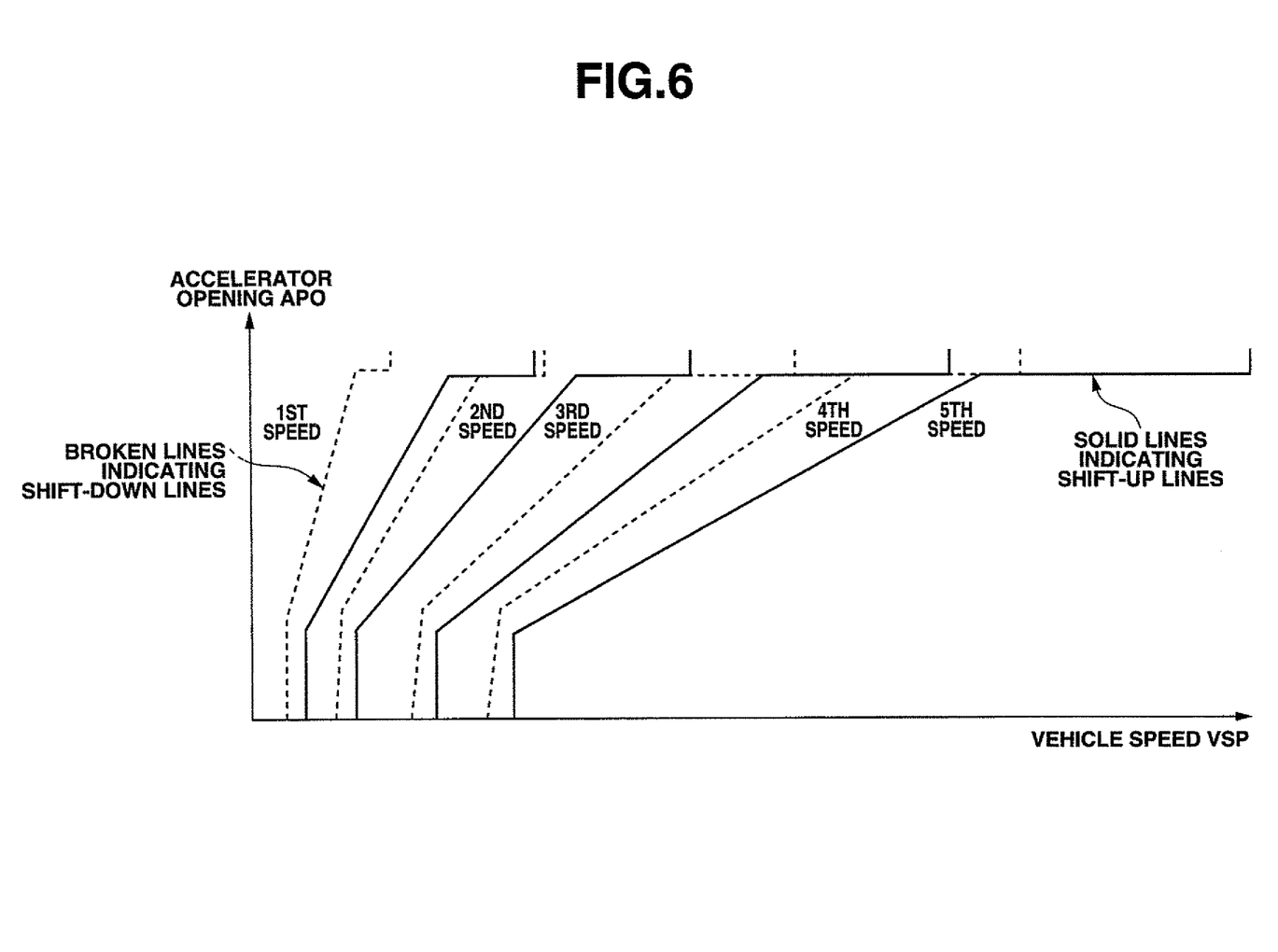
FIG. 6 is a normal shift map for an automatic transmission in an embodiment of the invention.

Shift control section 500 controls solenoid valves installed in automatic transmission AT to achieve the target second clutch engagement capacity and the target range gear position in accordance with the shift schedule shown in the normal shift map of FIG. 6. In the shift map of FIG. 6, target range gear positions are preset or preprogrammed based on vehicle speed VSP and accelerator opening APO. In FIG. 6, the solid lines indicate upshift lines, whereas the broken lines indicate downshift lines. The area from first speed gear to the 2-3 upshift line is hereinafter referred to as the "first area," whereas the area from the 2-3 upshift line to the fifth speed gear side is hereinafter referred to as the "second area."

Figure 12:
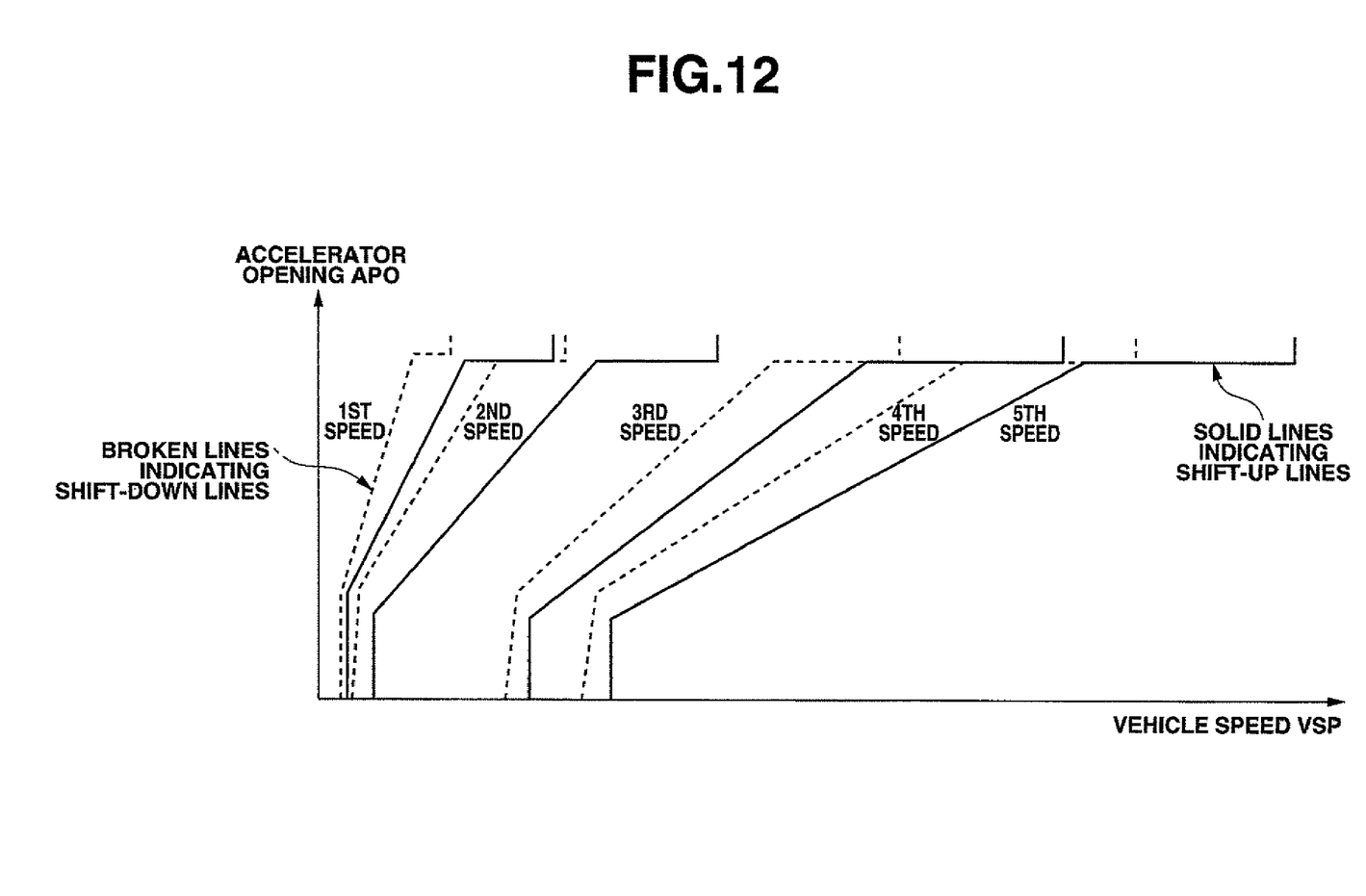
FIG. 12 is an overheating-period adaptive shift map for the automatic transmission in an embodiment of the invention.

The shift control section 500 further includes or stores an overheating-period adaptive shift map such as that shown in FIG. 12. As compared to the normal control state shift map of FIG. 6, in FIG. 12 the first area is narrower, whereas the second area is wider. In other words, as compared to the normal control state shift map of FIG. 6, the overheating-period adaptive shift map of FIG. 12 is preset to increase a vehicle driving state of a certain range gear position higher the 3rd speed gear.

Figure 7:
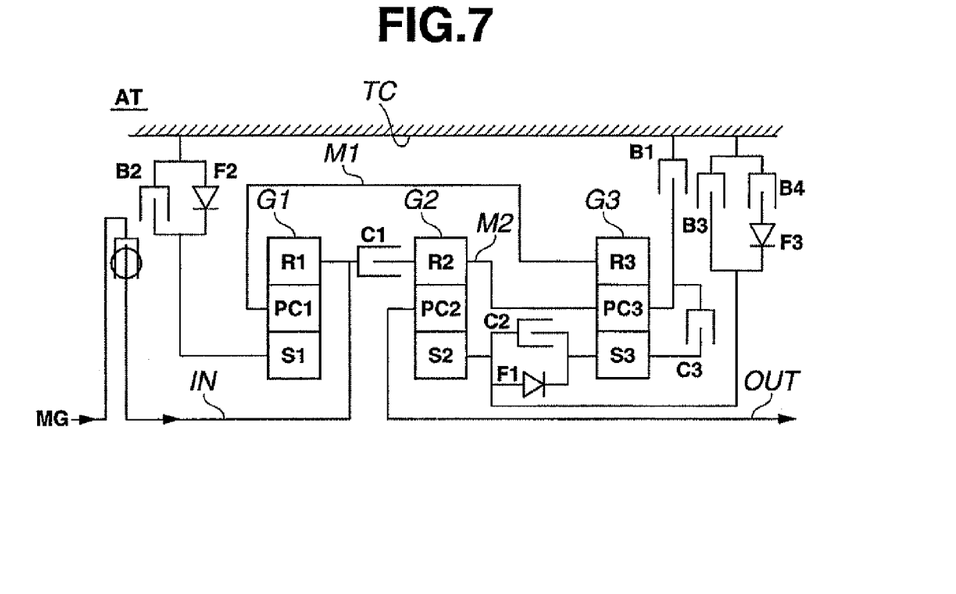
FIG. 7 is a skeleton diagram of the automatic transmission in an embodiment of the invention.
Figure 8:
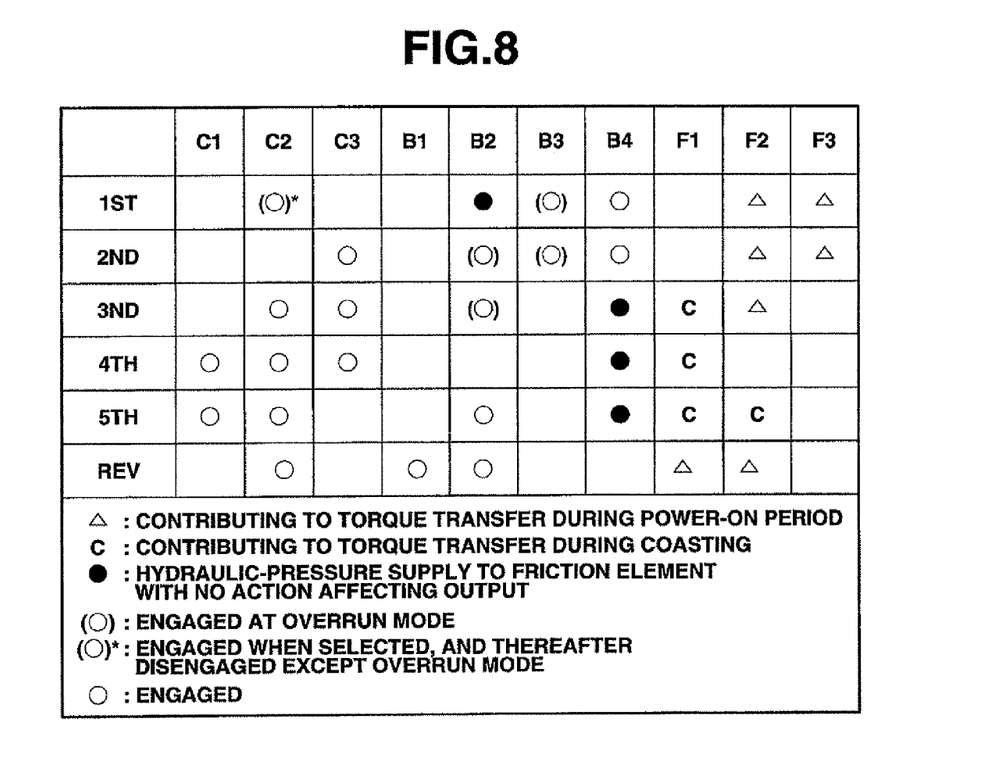
FIG. 8 is a clutch-engagement and band-brake-application chart of the automatic transmission in an embodiment of the invention.

FIG. 7 is the skeleton diagram showing the automatic transmission power train, which is applicable to the drive system of the hybrid vehicle. FIG. 8 is the automatic transmission AT clutch-engagement and band-brake-application chart, which is applicable to the drive system of the hybrid vehicle.

As shown in FIG. 7, automatic transmission AT employs three simple planetary gear sets, namely, a front planetary gear G1, a mid planetary gear G2 and a rear planetary gear G3. As rotary elements, the front planetary gear G1 has a front sun gear S1, a front carrier PC1 and a front ring gear R1. As rotary elements, the mid planetary gear G2 has a mid sun gear S2, a mid carrier PC2 and a mid ring gear R2. As rotary elements, the rear planetary gear G3 has a rear sun gear S3, a rear carrier PC3 and a rear ring gear R3.

In FIG. 7, the symbol "IN" denotes the transmission input shaft into which a driving torque is input from only motor-generator MG or from both engine E and motor-generator MG via the damper. The symbol "OUT" denotes the output shaft of automatic transmission AT via which a driving torque is output into rear-left and rear-right wheels RL, RR.

As a five-forward-and-one-reverse-speed transmission, the automatic transmission AT employs an input clutch C1, high-and-low reverse clutch C2, a direct clutch C3, a reverse brake B1, a front brake B2, a low coast brake B3, forward brake B4, a first one-way clutch F1, a third one-way clutch F2 and a forward one-way clutch F3.

With input clutch C1 disengaged, the input clutch C1 connects front ring gear R1 to input shaft IN. With the input clutch C1 engaged, the input clutch C1 connects both the front ring gear R1 and mid ring gear R2 to input shaft IN. With high-and-low reverse clutch C2 engaged, the high-and-low reverse clutch C2 connects mid sun gear S2 and rear sun gear S3. With direct clutch C3 engaged, the direct clutch C3 connects rear sun gear S3 and rear carrier PC3.

With reverse brake B1 applied, the reverse brake B1 fixes rear carrier PC3 to a transmission case TC. With front brake B2 applied, the front brake 112 fixes front sun gear S1 to transmission case TC. With forward brake B4 applied, the forward brake B4 connects mid sun gear S2 to transmission case TC.

First one-way clutch F1 permits free rotation of rear sun gear S3 relative to mid sun gear S2 in the normal-rotational direction (in the same rotational direction as the engine E) and prevents reverse rotation of the rear sun gear S3. Third one-way clutch F2 permits free rotation of front sun gear S1 in the normal-rotational direction and prevents reverse rotation of the front sun gear S1. Forward one-way clutch F3 permits free rotation of mid sun gear S2 in the normal-rotational direction and prevents reverse rotation of the mid sun gear S2.

Output shaft OUT is directly coupled with mid carrier PC2. Front carrier PCd and rear ring gear R3 are directly coupled with each other via a first member M1. Mid ring gear R2 and rear carrier PC3 are directly coupled with each other via a second member M2.

As can be seen from the clutch-engagement and band-brake-application chart of FIG. 8, automatic transmission AT achieves a first speed gear by engaging (or applying) each of high-and-low reverse clutch C2, front brake 12, low coast brake B3 and forward brake 14. A second speed gear is achieved by engaging each of direct clutch C3, front brake 112, low coast brake B3 and forward brake B4. A third speed gear is achieved by engaging each of high-and-low reverse clutch C2, direct clutch C3, front brake B2 and forward brake 114.

A fourth speed gear is achieved by engaging each of input clutch C1, high-and-low reverse clutch C2, direct clutch C3 and forward brake B4. A fifth speed gear is achieved by engaging each of input clutch C1, high-and-low reverse clutch C2, front brake B2 and forward brake B4. A reverse speed gear is achieved by engaging each of high-and-low reverse clutch C2, reverse brake B1 and front brake B2.

In an embodiment taught herein, when the gear position is either one of the 1st and 2nd speeds (hereinafter the "first range gear position"), forward brake B4 (hereinafter the "second engagement element") is selected as the second clutch CL2. When the gear position is any one of the 3rd speed to the 5th speed (hereinafter the "second range gear position"), high-and-low reverse clutch C2 (hereinafter the "third engagement element") is selected as the second clutch CL2.

Figure 9:
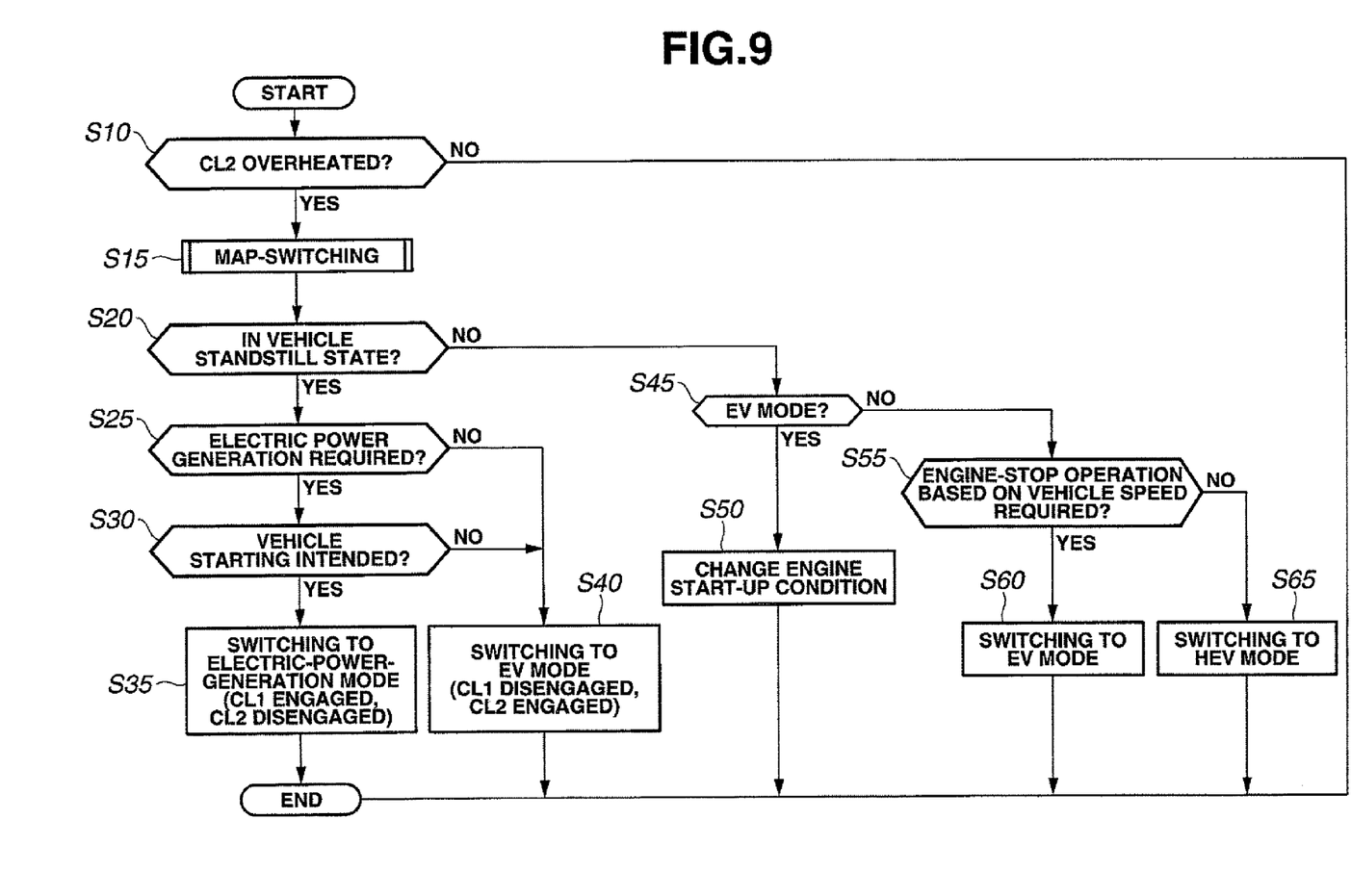
FIG. 9 is a flow chart showing an overheating-period adaptive control in an embodiment of the invention.

Overheating-period adaptive control processing is initiated when second clutch CL2 has overheated due to slip control executed during the WSC mode. FIG. 9 is the flow chart showing the overheating-period adaptive control processing.

At step S10 a determination is made as to whether second clutch CL2 is overheating. When it is determined that second clutch CL2 is overheating, the routine proceeds to step S15. Conversely, when the second clutch CL2 does not overheat, the current cycle of this routine terminates. Overheating of the second clutch CL2 is determined by detecting the second clutch temperature If the second clutch temperature detected by temperature sensor 10a is higher than or equal to a predetermined temperature value then the second clutch CL2 is overheating. The predetermined temperature value is preset to a temperature value at which the clutch plates of the second clutch CL2 may seize (or fail to engage), such as for example when the second clutch CL2 is continuously kept in the overheating state, or in the presence of a further heat input under the overheating state.

Figure 11:
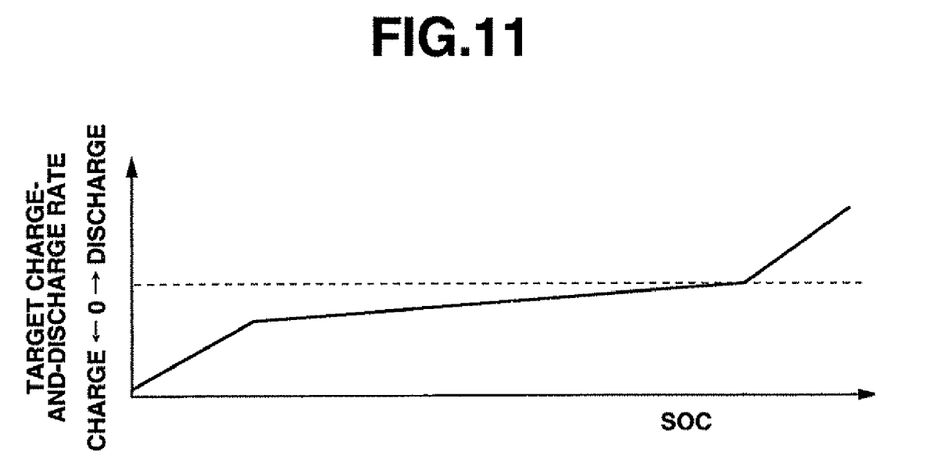
FIG. 11 is an overheating-period adaptive target charge-and-discharge rate map.

At step S15 the target charge-and-discharge rate map is switched from the normal control state target charge-and-discharge rate map (see FIG. 5) to the overheating-period adaptive target charge-and-discharge rate map (shown by example in FIG. 11). Additionally, the shift map is switched from the normal control state shift map (see FIG. 6) to the overheating-period adaptive shift map (shown by example in FIG. 12).

At step S20 a determination is made as to whether the vehicle is in its standstill state. When the vehicle is in the standstill state, the routine proceeds to step S25. Conversely, when the vehicle is out of the standstill state the routine proceeds to step S45. For example, a standstill state of the vehicle may be determined by the following: at least one of a signal from the wheel speed sensor 19 and the vehicle speed sensor 17 is "0", or the switch signal from inhibitor switch 7a indicates a particular position such as a park position. It will be appreciated that a decision for a vehicle standstill state is not limited to the particular embodiments shown and described herein.

At step S25 a check for the presence or absence of a demand for electric power generation is made based on the overheating-period adaptive target charge-and-discharge rate map of FIG. 11. When a demand for electric power generation is present, the routine proceeds to step S30. Conversely, when a demand for electric power generation is absent the routine proceeds to step S40.

At step S30 a check for the presence or absence of an intent to start the vehicle is made. When an intent to start is present the routine proceeds to step S35. Conversely, when an intent to start is absent, the routine proceeds to step S40. The presence or absence of an intent to start is determined from a signal resulting from the driver's operation of the vehicle in the standstill state. For example, the determination of the presence or absence of the intent to start may be made based on whether a signal from inhibitor switch 7a indicates a parking range or a running range such as a drive range, or whether a signal from brake stroke sensor 20 indicates the release of the brake pedal. On the other hand, a signal from accelerator opening sensor 16 is relayed after the output of the inhibitor switch 7a and the brake stroke sensor 20. Thus, there is a delay in the relay response of the accelerator opening sensor signal that allows for a decision of the presence or absence of the intent to start.

At step S35 the switch to the electric-power-generation mode occurs. In this mode, the motor-generator MG is operated as a generator utilizing the power of engine E.

At step S40 switching to the EV mode occurs.

At step S45 a determination is made as to whether the current drive mode is the EV mode. When the vehicle is in the EV mode, the routine proceeds to step S50. Conversely, when the vehicle is out of the EV mode the routine proceeds to step S55.

At step S50, the start-up condition of engine E is changed. Within the mode-selection section 200, the mode-selection map is switched from the normal control state EV-HEV mode-selection map (see FIG. 4) to the overheating-period adaptive EV-HEV mode-selection map (shown by example in FIG. 10).

At step S55, a determination is made based on vehicle speed VSP whether an engine-stop demand is present. In the presence of an engine-stop demand, the routine proceeds to step S60 so as to switch the drive mode to the EV mode. In the absence of an engine-stop demand, the routine proceeds to step S65 so as to switch the drive mode to the HEV mode. As described previously, the determination of an engine-stop demand can be based on the vehicle speed VSP and whether it is less than a predetermined vehicle speed VSP1 with automatic transmission AT conditioned in the first speed gear. A function for this determination is set or incorporated in the overheating-period adaptive EV-HEV mode-selection map of FIG. 10.

The operation of the overheating-period adaptive control is hereunder described for different situations. For each situation, forward brake B4, serving as second clutch CL2, is in the overheated state, and the target charge-and-discharge rate map and the shift map have both been switched to their overheating-period adaptive counterparts. Thus, the demand for charging the battery 4 is relayed during the overheating-period adaptive control rather than during the normal control. Additionally, the shift map is set to use a range gear position that does not use the overheating forward brake B4 during the overheating-period adaptive control rather than the normal control.

When the vehicle is in the stand-still state, the mode is set to the electric-power-generation mode whereby the state of charge (SOC) of the battery 4 is increased. Due to the increase in the battery SOC, it is possible to extend the period in which the vehicle can run at the EV mode after vehicle startup. This in turn reduces the time that forward brake B4 is subjected to slip control.

During vehicle standstill in which the electric-power-generation mode is selected, first clutch CL1 is in the engaged state while second clutch CL2 (forward brake B4) is in the disengaged state. Suppose that second clutch CL2 is overheated when the vehicle starts under these conditions. In this case, to avoid slip control of second clutch CL2, the vehicle starting operation is performed at the EV mode rather than the WSC mode. As seen in the mode selection map of FIG. 4, during normal control, the WSC mode can be selected, but during overheating-period adaptive control there is no possibility that the WSC mode can be selected as seen in the alternative mode selection map of FIG. 10.

At this time (vehicle startup), the vehicle has to be started after first clutch CL1 has been temporarily released and second clutch CL2 has been fully engaged, and thus there is a risk of a start time lag. To avoid this lag, the mode is quickly switched to the EV mode, triggered by an intent to start as discussed previously. As a result, near simultaneous output of the driving force with the driver's accelerator-pedal depression is possible, providing high responsiveness.

Figure 10:
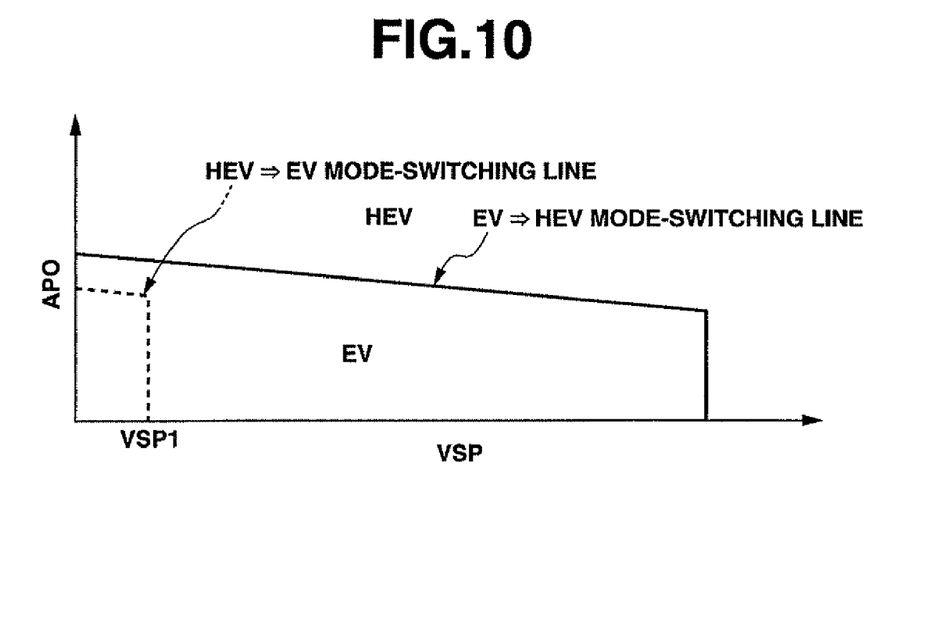
FIG. 10 is an overheating-period adaptive EV-HEV mode-selection map.

When the vehicle is driving in the EV mode, the engine start-up condition is changed, and the overheating-period adaptive EV-HEV mode-selection map shown in FIG. 10 is selected. In comparison with the normal control state EV-HEV mode-selection map of FIG. 4, the area under (surrounded by) the EV→HEV mode-switching line is wider, extending the time before the switch to the HEV mode is necessary.

That is, when initiating an EV-to-HEV mode transition, engine E has to be started up. During the engine start-up period, according to the previously-described engine start-up control, second clutch CL2 is continuously subjected to slip control. Therefore, by maintaining the EV mode as long as possible, the number of engine start-up operations is reduced, thus reducing further overheating of second clutch CL2.

Additionally, the HEV→EV mode-switching line is set to allow the mode-switching operation only when the vehicle speed falls below the predetermined vehicle speed VSP1 (such as the idle speed of engine E), with automatic transmission AT in the first speed gear. By maintaining the HEV mode as long as possible after having changed from the EV mode to the HEV mode, the possibility of a re-transition from the EV mode to the HEV mode is reduced. In other words, the potential for re-execution of engine start-up control is minimized, thus reducing overheating of second clutch CL2.

Driving of the vehicle in the EV mode or the HEV mode, shift control is executed in accordance with the overheating-period adaptive shift map of FIG. 12 rather than the normal shift map. When forward brake B4, serving as second clutch CL2, is overheated, forward brake B4 is released. Therefore, the vehicle is propelled while using one of range gear positions, such as the 3rd, 4th or 5th speed gear. At these gears, high-and-low reverse clutch C2 is engaged. Thus, it is possible to increase engine start-up control with the use of the non-overheated high-and-low reverse clutch C2, further reducing deterioration and increasing durability of second clutch CL2.

Common to each respective situation, the system does not select WSC mode when second clutch CL2 has been overheated. In order to avoid subjecting second clutch CL2 to slip control, as much as possible the mode is limited to either the EV mode or the HEV mode.

In an EV-to-HEV mode transition, slip control caused by engine start-up control is required, and thus it is necessary to reduce the number of executions of such mode transitions. By executing the overheating-period adaptive control, fully taking into account this factor, it is possible to provide the following operational effects.

First, when the temperature of second clutch CL2 is higher than or equal to the predetermined temperature for starting the vehicle from its standstill state, the mode is switched to the LV mode without selecting the WSC mode. Thus, second clutch CL2 is not subjected to slip control, and the vehicle can drive with second clutch CL2 fully engaged, thereby avoiding overheating second clutch CL2.

Second, when the temperature of second clutch CL2 is higher than or equal to the predetermined temperature value, the system increases the charging rate of the battery 4. By way of setting or switching to an overheating-period adaptive target charge-and-discharge amount map, a demand for battery charging can be issued even when the state of charge (SOC) is higher than a usual battery SOC. As a result, it is possible to increase the period that the vehicle can operate in the EV mode. This reduces the number of executions of slip control by second clutch CL2 necessitated by engine start-up control for an EV-to-HEV mode transition.

Third, when the temperature of second clutch CL2 is higher than or equal to the predetermined temperature value for the vehicle standstill state, the mode is switched to the electric-power-generation mode. This makes it possible to efficiently increase the battery SOC.

Fourth, when the driver's intent to start the vehicle has been detected, the mode is switched from the electric-power-generation mode to the EV mode. This ensures high responsiveness during the vehicle startup period.

Fifth, when the temperature of second clutch CL2 is higher than or equal to the predetermined temperature value, the system inhibits switching to the WSC mode subsequent to one HEV mode transition during vehicle driving. This eliminates the necessity of executing slip control by second clutch CL2. This reduces the exposure of second clutch CL2 to further overheating.

Sixth, when the temperature of forward brake B4 (serving as second clutch CL2) is less than the predetermined temperature value, the range gear position of automatic transmission AT is selected based on the normal shift map. Conversely, when the temperature of second clutch CL2 is higher than or equal to the predetermined temperature value the range gear position of automatic transmission AT is selected based on the overheating-period adaptive shift map. In the overheating-period adaptive shift map, the first area of the 1st and 2nd speed gears is more narrow than in the normal shift map. Therefore, when an EV-to-HEV mode transition occurs, it more likely occurs in the second area of the 3rd, 4th, and 5th speed gears. Even when slip control is necessitated by engine start-up control, forward brake B4 is not further overheated.

In situations where the high-and-low reverse clutch C2 is used and hence overheats, it will be appreciated that it is preferable to increase the use of forward brake B4 as much as possible. Alternatively, the system may be configured to permit an EV-to-HEV mode-transition only at any one of the 3rd, 4th, and 5th speed gears when the temperature of forward brake B4 is higher than or equal to the predetermined temperature value. This would reduce the overheating of forward brake B4.

While the forgoing is a description of embodiments of the control apparatus of the hybrid vehicle of the invention, it will be understood that the invention is not limited to the particular embodiments shown and described herein, but that various changes and modifications may be made without departing from the scope or spirit of this invention as defined by the following claims. For example, in other embodiments, the second clutch may be disposed between the motor-generator and the transmission as an additional clutch, rather than disposed within the automatic transmission. Alternatively, the second clutch may be disposed between the transmission and the drive wheels as an additional clutch. Furthermore, the concept of the invention is applicable to a hybrid vehicle employing only the first clutch (an engine clutch) or applicable to a hybrid vehicle capable of achieving both of a hybrid drive mode and an electric drive mode without the first and second clutches. This is because motor speed and motor torque can be controlled independently of each other even if there is an influence or fluctuation in motor efficiency.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A control apparatus for a hybrid vehicle, comprising:
   an engine;
   a motor-generator;
   a first engagement element disposed between the engine and the motor-generator;
   a second engagement element disposed between the motor-generator and a drive wheel;
   a temperature detector operable to detect a temperature of the second engagement element; and
   a controller operable to:
      selectively provide one of a first drive mode in which the first engagement element is disengaged and the second engagement element is engaged to drive the vehicle only using the motor-generator, a second drive mode in which the first and second engagement elements are engaged to drive the vehicle using both the engine and the motor-generator and a third drive mode in which the first engagement element is engaged and the second engagement element is in slip-engagement to drive the vehicle using both the engine and the motor-generator; and
      select the first drive mode when the temperature of the second engagement element is higher than or equal to a predetermined temperature value during a low-speed driving period below a predetermined vehicle speed.

2. The control apparatus according to claim 1 wherein the controller is further operable to:
   switch from the third drive mode to the first drive mode when the temperature of the second engagement element is higher than or equal to the predetermined temperature value when the vehicle is in the third drive mode during the low-speed driving period below the predetermined vehicle speed.

3. The control apparatus according to claim 1 wherein the low-speed driving period below the predetermined vehicle speed is a starting period from a vehicle standstill state.

4. The control apparatus according to claim 1 wherein the controller is further operable to:
   increase a battery charging rate to a charging rate higher than a usual charging rate when the temperature of the second engagement element is higher than or equal to the predetermined temperature value.

5. The control apparatus according to claim 3, further comprising;
   an intent-to-start detector operable to detect a driver's intent to start the vehicle, wherein the controller is further operable to:
      select an electric-power-generation mode in which the first engagement element is engaged and the second engagement element is disengaged to operate the motor-generator as a generator utilizing the driving force produced by the engine when the temperature of the second engagement element is higher than or equal to the predetermined temperature value in the vehicle standstill state; and
      switch to the first drive mode from the electric-power-generation mode when the intent to start has been detected.

6. The control apparatus according to claim 1 wherein the controller is further operable to:
   inhibit switching to the third drive mode after selection of the second drive mode during vehicle driving when the temperature of the second engagement element is higher than or equal to the predetermined temperature value.

7. The control apparatus according to claim 1, further comprising:
   an automatic transmission having a first range gear position to establish a power transmission path between the motor-generator and the drive wheel via the second engagement element, and a second range gear position to establish a power transmission path via the first engagement element with the second engagement element disengaged;

engine start-up control means for increasing a motor-generator driving force when the first engagement element is disengaged and for setting an engagement capacity of the second engagement element to an engagement capacity corresponding to a transferred torque before starting the engine; and wherein the controller is further operable to:

switch from the first drive mode to either one of the second and third drive modes only in the second range gear position when the temperature of the second engagement element is higher than or equal to the predetermined temperature value.

8. The control apparatus according to claim 7 wherein the controller is further operable to:

store a normal shift map having a first area corresponding to the first range gear position and a second area corresponding to the second range gear position;

store a narrow first-area shift map in which the first area is narrow in comparison with the normal shift map;

select either one of the first and second areas based on a vehicle driving condition;

select one of the first range gear position and the second range gear position in the selected area using the normal shift map when the temperature of the second engagement element is less than the predetermined temperature value and using the narrow first-area shift map when the temperature of the second engagement element is higher than or equal to the predetermined temperature value.

9. The control apparatus according to claim 1 wherein the low-speed driving period below the predetermined vehicle speed is a slow period resulting from uphill driving.

10. A controller for a hybrid vehicle having an engine, a motor-generator, a first engagement element disposed between the engine and the motor-generator, and a second engagement element disposed between the motor-generator and a drive wheel, the controller comprising:

means for detecting a temperature of the second engagement element; and means for disengaging the first engagement element and engaging the second engagement element to drive the vehicle only by a driving force produced by the motor-generator when a temperature of the second engagement element is higher than or equal to a predetermined temperature value during a low-speed driving period below a predetermined vehicle speed.

11. The controller according to claim 10, further comprising:

means for increasing a battery charging rate to a charging rate higher than a usual charging rate when the temperature of the second engagement element is higher than or equal to the predetermined temperature value.

12. The controller according to claim 10, further comprising:

a first drive mode in which the first engagement element is disengaged and the second engagement element is engaged to drive the vehicle only using the motor-generator;

a second drive mode in which the first and second engagement elements are engaged to drive the vehicle using both the engine and the motor-generator;

a third drive mode in which the first engagement element is engaged and the second engagement element is in slip-engagement to drive the vehicle using both the engine and the motor-generator; and means for inhibiting selection of the third drive mode after the second drive mode has been provided during vehicle driving when the temperature of the second engagement element is higher than or equal to the predetermined temperature value.

13. The controller according to claim 10 wherein the low-speed driving period is a starting period from a vehicle standstill state, and wherein the controller further comprises:

means for detecting an intent to start the vehicle;

means for selectively providing an electric-power-generation mode in which the first engagement element is engaged and the second engagement element is disengaged when the temperature of the second engagement element is higher than or equal to the predetermined temperature value in the vehicle standstill state; and means for switching to the first drive mode from the electric-power-generation mode when the intent to start has been detected.

14. The controller according to claim 10 wherein the hybrid vehicle has an automatic transmission having a first range gear position to establish a power transmission path between the motor-generator and the drive wheel via the second engagement element and a second range gear position to establish a power transmission path via the first engagement element with the second engagement element disengaged, the controller further comprising:

means for increasing a motor-generator driving force when the first engagement element is disengaged;

means for setting an engagement capacity of the second engagement element to an engagement capacity corresponding to a transferred torque before starting the engine; and means for switching from the first drive mode to either one of the second and third drive modes only in the second range gear position when the temperature of the second engagement element is higher than or equal to the predetermined temperature value.

15. The controller according to claim 14, further comprising:

means for storing a normal shift map having a first area corresponding to the first range gear position and a second area corresponding to the second range gear position and for storing a narrow first-area shift map in which the first area is narrow in comparison with the normal shift map;

means for selecting either one of the first and second areas based on a vehicle driving condition;

means for selecting one of the first range gear position and the second range gear position in the selected area using the normal shift map when the temperature of the second engagement element is less than the predetermined temperature value and using the narrow first-area shift map when the temperature of the second engagement element is higher than or equal to the predetermined temperature value.

16. A control method for a hybrid vehicle including a motor-generator, an engine, a first engagement element disposed between the engine and the motor-generator and a second engagement element disposed between the motor-generator and a drive wheel, the method comprising:

detecting a temperature of the second engagement element; and disengaging the first engagement element and engaging the second engagement element to drive the vehicle only by a driving force produced by the motor-generator when a temperature of the second engagement element is higher than or equal to a predetermined temperature value during a low-speed driving period below a predetermined vehicle speed.

17. The control method according to claim 16 wherein the hybrid vehicle includes a first drive mode in which the first engagement element is disengaged and the second engagement element is engaged to drive the vehicle only using the motor-generator; a second drive mode in which the first and second engagement elements are engaged to drive the vehicle using both the engine and the motor-generator; and a third drive mode in which the first engagement element is engaged and the second engagement element is in slip-engagement to drive the vehicle using both the engine and the motor-generator, the method further comprising:
increasing a battery charging rate to a charging rate higher than a usual charging rate when the temperature of the second engagement element is higher than or equal to the predetermined temperature value; and
inhibiting the selection of the third drive mode after the second drive mode has been provided during vehicle driving when the temperature of the second engagement element is higher than or equal to the predetermined temperature value.

18. The control method according to claim 16 wherein the low-speed driving period is a starting period from a vehicle standstill state, and wherein the method further comprises:
detecting an intent to start the vehicle;
selectively providing an electric-power-generation mode in which the first engagement element is engaged and the second engagement element is disengaged when the temperature of the second engagement element is higher than or equal to the predetermined temperature value in the vehicle standstill state; and
switching to a first drive mode from the electric-power-generation mode when the intent to start has been detected, the first drive mode including disengaging the first engagement element and engaging the second engagement element to drive the vehicle only using the motor-generator.

19. The control method according to claim 16 wherein the hybrid vehicle has an automatic transmission having a first range gear position to establish a power transmission path between the motor-generator and the drive wheel via the second engagement element and a second range gear position to establish a power transmission path via the first engagement element with the second engagement element disengaged, the method further comprising:
increasing a motor-generator driving force when the first engagement element is disengaged;
setting an engagement capacity of the second engagement element to an engagement capacity corresponding to a transferred torque before starting the engine; and
switching from the first drive mode to either one of the second and third drive modes only in the second range gear position when the temperature of the second engagement element is higher than or equal to the predetermined temperature value.

20. The control method according to claim 16 wherein the hybrid vehicle has an automatic transmission having a first range gear position to establish a power transmission path between the motor-generator and the drive wheel via the second engagement element and a second range gear position to establish a power transmission path via the first engagement element with the second engagement element disengaged, the method further comprising:
selecting either one of a first and a second area based on a vehicle driving condition, the first area corresponding the first range gear position and the second area corresponding to the second range gear position;
selecting one of the first range gear position and the second range gear position in the selected area using a normal shift map when the temperature of the second engagement element is less than the predetermined temperature value, the normal shift map including the first area and the second area, and using a narrow first-area shift map when the temperature of the second engagement element is higher than or equal to the predetermined temperature value, the narrow first-area shift map including the first area and the second area in which the first area is narrower in comparison that in the normal shift map.

* * * * *